United States Patent
Shimizu

(10) Patent No.: US 6,510,502 B1
(45) Date of Patent: Jan. 21, 2003

(54) INFORMATION PROCESSING DEVICE AND METHOD FOR READING INFORMATION RECORDED ON AN INFORMATION RECORDING MEDIUM

(75) Inventor: Yusuke Shimizu, Tokyo (JP)

(73) Assignee: Kabushiki Kaisha Sega Enterprises (JP)

( * ) Notice: Subject to any disclaimer, the term of this patent is extended or adjusted under 35 U.S.C. 154(b) by 0 days.

(21) Appl. No.: 09/462,792

(22) Filed: Jul. 17, 2000

(30) Foreign Application Priority Data

May 14, 1998 (JP) .......................................... 10-132095

(51) Int. Cl.$^7$ ............................................. G06F 12/00
(52) U.S. Cl. ....................................................... 711/164
(58) Field of Search .................................. 711/163, 164

(56) References Cited

U.S. PATENT DOCUMENTS

| | | | | |
|---|---|---|---|---|
| 4,713,753 A | * | 12/1987 | Boebert et al. ............ | 340/5.74 |
| 4,740,890 A | | 4/1988 | William | |
| 5,259,029 A | * | 11/1993 | Duncan ...................... | 235/380 |
| 5,341,429 A | | 8/1994 | Stringer et al. | |
| 5,367,704 A | * | 11/1994 | Hasuo et al. ............... | 711/163 |
| 5,564,038 A | | 10/1996 | Grantz et al. | |
| 5,689,560 A | | 11/1997 | Cooper et al. | |
| 5,708,709 A | | 1/1998 | Rose | |
| 5,771,347 A | | 6/1998 | Grantz et al. | |

FOREIGN PATENT DOCUMENTS

| | | |
|---|---|---|
| EP | 0 601 500 | 6/1994 |
| EP | 0 684 538 | 11/1995 |
| EP | 0 778 512 | 6/1997 |
| JP | 7-78079 | 3/1995 |
| JP | 7-295803 | 11/1995 |
| JP | 7-319689 | 12/1995 |
| JP | 8-194748 | 7/1996 |
| JP | 9-288575 | 11/1997 |

OTHER PUBLICATIONS

Nakazawa, "Software Distribution Technic Using CD–Rom", The Institute of Electronics and Communication Engineers of Japan, vol. 94, No. 240 (ISEC–94–18), pp. 41–46.

* cited by examiner

*Primary Examiner*—Kevin Verbrugge
(74) *Attorney, Agent, or Firm*—Finnegan, Henderson, Farabow, Garrett & Dunner, L.L.P.

(57) ABSTRACT

The object of the present invention is to implement, by a simple arrangement, means for making the same information recording medium function selectively as a product version or as a demo version, and to provide a method of information processing whereby illicit use by a third party can be prevented. In a method of information processing according to the present invention, game software (a CD ROM) on which a game program is stored is inserted into a game device (step A1), and the content of back-up memory is read (step A2). A determination is made as to whether or not license information is written in the back-up memory (step A3) and, if no license information is written therein, the game software is made to function as the demo version (step A8). If license information is written therein, license checking is performed (step A4) and, as a result of the checking, the game software is made to function as the product version or as the demo version (steps A6, A7).

38 Claims, 11 Drawing Sheets

INFORMATION PROCESSING DEVICE AND METHOD FOR READING INFORMATION RECORDED ON AN INFORMATION RECORDING MEDIUM

TECHNICAL FIELD

The present invention relates to information processing devices such as games devices. In particular, it relates to a security system whereby means for altering (for example so as to cause the same information recording medium to selectively function as a demo version or as the product version) under prescribed conditions the processing content of a program stored on an information recording medium, such as game software, can be implemented by a simple construction and illicit use by a third party can be effectively prevented.

BACKGROUND ART

Game software used in game devices is distributed in the market by being recorded on portable information recording media such as for example CD ROMs or game cartridges. Such game software may comprise a regular product version which the user uses by obtaining a license from the licenser and a demo version (sample version) with the object of introducing an outline of the game to the user, subject to restrictions on some, of the processing content of the game. By introducing such a demo version on the market, it is made possible for the user to try out the demo version of the game software, and, if he likes this, to obtain a license from the licenser so as to be able to enjoy the regular product.

However, since, conventionally, the demo version was prepared separately apart from the regular product version, it was necessary to manufacture two types of information recording medium in respect of the same game software. This meant that a large amount of storage space was required for the product, increasing production costs. Also, since it was necessary to stock two types of product, namely, the product version and demo version, there were problems such as that it took time before a user could be supplied with the product version after purchasing the demo version. In view of these circumstances, it was desired to realize means for making it the same game software function selectively as a product version or as a demo version. In such cases, in particular, it was desired to realize means for effectively preventing the game software from being used as the product version by illicit use by a third party.

Also, the present applicants, in Laid-open Japanese Patent Publication No. H. 11-53183, proposed a technique for altering the setting of processing content of a game program in accordance with the results obtained by ascertaining whether the game recording medium was being employed in the user's own game device or was being employed in another game device. By such a technique, since it becomes possible to produce a difference in the operating environment by differentiating game recording media employed in the user's own game device from game recording media employed in other game devices, the value of a game recording medium employed solely in the uses own game device can be raised.

However, with this technique in order to ascertain whether or not the game recording medium was being used in the user's own game device, a writable region was provided on the game recording medium, and the aforesaid decision processing was performed by writing identification information (for example an ID number) of the recording medium in this region. This technique therefore could not be applied to read-only media such as CD ROMs or DVD ROMs, owing to the difficulty of providing a writable region. Furthermore, with this prior art technique, there was the risk that the identification information written on the game recording medium might be rewritten by illicit means to enable its use on another game device.

DISCLOSURE OF THE INVENTION

Accordingly, a first object of the present invention is to provide an information processing device, information processing method and information recording medium with a simple arrangement whereby the processing content of a prescribed program stored on the same information recording medium can be altered under prescribed conditions.

Also, a second object is to provide an information processing device, information processing method and information recording medium whereby illicit use by a third party can be prevented.

Furthermore, a third object of the present invention is to provide an information processing system that without providing a writable region on an information recording medium, can decide whether or not software recorded on the information recording medium was processed by a user's own information processing terminal and that can realize by a simple arrangement means for varying the processing content of the software in accordance with the result of this decision and an information processing terminal and server that can be applied to this information processing system.

Furthermore, a fourth object is to provide an information recording medium on which is recorded a procedure to make a computer function as an information processing terminal or server as aforesaid.

The first object of the present invention is solved by an information processing device comprising: first means for storage that stores first identification information that is individual to the information processing device; means for reading second identification information that is individual to the information recording medium second means for storage that stores prescribed information including operation restriction of the information recording medium, third identification information individual to some information processing device, and fourth identification information individual to some information recording medium; and means for restricting the operation content of the information recording medium when the first identification information and the third identification information coincide and the second identification information and the fourth identification information coincide, in accordance with the prescribed information; and for restricting the operation content of the information recording medium under a predetermined condition when the first identification information and said third identification information do not coincide or the second identification information and the fourth identification information do not coincide. In particular, the prescribed information including operation restrictions of the information recording medium may be information specifying period of use or conditions of use etc. of the information recording medium (hereinbelow in this specification called "license content information").

With such an arrangement the information including license content information, third identification information and fourth identification information (hereinbelow in this specification called "license information") is supplied from the licenser to the user. This license information is stored on a suitable recording medium such as for example a portable storage medium such as back-up memory.

When an information processing device according to the present invention executes a prescribed program (for example a game program) that is recorded on an information recording medium, it determines in accordance with a prescribed algorithm whether or not the information recording medium is one for which a license has been granted (hereinbelow in this specification this is called "license checking"). If, as a result of the license checking, it is determined that the information recording medium is one for which a license has been granted, the information processing device can function to perform information processing of the information recording medium as a product version; if it is determined that the information recording medium is one for which a license has not been granted, it can function to perform information processing of the same information recording medium selectively as the product version or as a demo version, by subjecting the program that is stored on the information recording medium to prescribed restrictions.

The second object of the present invention is solved by sending license information to the inflation processing device through a communication circuit from a prescribed terminal device. In particular, preferably the license information is encrypted before being sent. With such an arrangement illicit diversion of the license information by a third party can be prevented.

Also, the second means for recording may be a portable recording medium that is externally mounted with respect to the information processing device, such as for example back-up memory. By providing license information of each individual information recording medium on each individual portable recording medium, the need to store the license information in the information processing device is eliminated.

As a preferred mode of the present invention, the information recording medium stores a game program.

In an information processing method for achieving an object of the present invention, processing steps are executed performed in various means of an information processing device according to the present invention.

An information recording medium for achieving an object of the present invention stores a program whereby an information processing method according to the present invention is executed in an information processing device.

An information recording medium as referred to herein records information (for example a game program) in a recording region of the information recording medium by some physical means, and is capable of provoking the execution of prescribed functions such as for example a game program by an information processing device such as a game device. Also, the information that is recorded therein is not restricted to a game program but could be for example CD music data or LD video data etc. The essential is that it should be capable of downloading a program to a computer by some means so as to muse this to execute a prescribed function, or cause the computer to reproduce music data or video data.

For example an information recording medium may include a CD-R, game cartridge, floppy disk magnetic tape, magneto-optic disc, CD ROM, DVD ROM, DVD RAM, ROM cartridge RAM cartridge with a battery back-up, flash memory cartridge or non-volatile RAM cartridge etc.

It may also included wired communication medium such as a telephone circuit, or communication medium such as a wireless communication medium such as a microwave circuit. The Internet is also included in communication media as referred to herein.

An information processing system according to the present invention for achieving the above third object comprises a plurality of information processing terminals that read prescribed software recorded on information recording media and execute this, and a server connected to said information processing terminals through a network and that manages the operating environment of processing at the information processing terminals, in which said saw mutually associates and stores registration information including first identification information dot is individually allocated to each information processing terminal, second identification information that is allocated beforehand to each type of software, and third identification information that is allocated to each said information recording medium in respect of software of the same type such that there is no overlap; said information processing terminal, on executing the software recorded on the information recording medium, transmits said first identification information and second identification information to the server and requests registration condition confirmation. When it has received said registration condition confirmation request, the server looks up the registration information, and, if a combination that has been sent from said information processing terminal of said first identification information and second identification information coincides with the registration information, sends to the information processing terminal a first checking result and sends a second checking result if said combination is not present. An information processing terminal that has received said first checking result executes said software under the ordinary operating environment, and an information processing terminal that has received the second checking result sends the third identification information and requests the server to register the third identification information. After it has received this registration request, the server looks up once more the registration condition and, if the third identification information that has been transmitted from the information processing terminal is not associated and registered in respect of any other information processing terminal, associates and registers this third identification information with said information processing terminal, and sends a first registration result to the information processing terminal; and, if the third identification information is associated and registered in respect of any other information processing terminal, or if there is abnormality in at least any one of the first information, second identification information or third identification information (such as for example where there is suspicion that these items of identification information have been input by illicit means or where the number of times of input of the identification information is more than necessary), sends a second registration result to the information processing terminal. After it has received the first registration result, the information processing terminal executes said software under the ordinary operating environment, and, after it has received said second registration result, said information processing terminal executes the software under a restricted operating environment.

With such a convenient arrangement, even without providing a writable region in the information recording medium, it is possible to determine whether or not the software that is recorded on the information recording medium was processed by the user's own information processing terminal, and to alter the content of software processing in accordance with the result of this determination. In particular, since the registration information of all the information processing terminals is managed by the server, illicit actions relying on falsifying the identification information etc. can be prevented, and the setting of the operating environment at each information processing terminal can be altered by rewriting the registration information.

In a preferred mode of the present invention, the information processing terminal reads the software that is recorded on the information recording medium and, when it executes this, transmits first identification information, second identification information and third identification information to the server and requests confirmation of the registration condition. When it has received the registration condition confirmation request, the server looks up the registration information, and, if a combination that has been sent from said information processing terminal of said first identification information and second identification information coincides with the registration information, sends to said, information processing terminal a checking result to that effect and if said combination is not present, if said third identification information is not associated and registered in respect of any other information processing terminal, associates and registers this third identification information with this information processing terminal, and sends a first registration result to the information processing terminal; and, if the third identification information is associated and registered in respect of any other information processing terminal, or if there is abnormality in at least any one of the first information, second identification information or third identification information, sends a second registration result to the information processing terminal. After it has received said checking result or first registration result the information processing terminal executes said software under the ordinary operating environment and, after it has received said second registration result, said information processing terminal executes said software under a restricted operating environment.

In the example described above, it was arranged for processing as a registered user (execution of the software under the ordinary operating environment) to be formed when the first identification information and second identification information agreed; however, it could be arranged for processing as a registered user to be performed if all of the first identification information, second identification information and third identification information agree. With such an arrangement, it is possible to ascertain positively and accurately whether or not the software is being used solely in the user's own information processing terminal.

It may be arranged for the information processing terminal, when sending the third identification information to the server, to read this third identification information stored beforehand in external memory, and to send this to the server.

With an information processing terminal according to the present invention that achieves the above third object and that reads and executes prescribed software recorded on an information recording medium, registration information including first identification information allocated individually to the information processing terminal, second identification information allocated beforehand to each type of software, and third identification information allocated to each said information recording medium in respect of software of the same type such that there is no overlap is mutually associated and stored, and when the software is executed the first identification information and second identification information are sent and a registration condition confirmation request is made to a server connected to this information processing terminal through a network. If a checking result is received to the effect that the combination of the first identification information and second identification information coincides with registration information managed by the server, said software is executed under the ordinary operating environment; if a checking result is received to the effect that this combination does not exist, third identification information is sent and a registration request of the third identification information is made to the server. If a registration result to the effect that registration was performed correctly is received, said software is executed under the ordinary operating environment, but, if registration was not performed correctly, said software is executed under a restricted operating environment.

In a preferred mode of the present invention, an information processing terminal, when it executes said software, sends first identification information, second identification information, and third identification information and makes a registration condition confirmation request to a server connected thereto through a network. If a checking result is received to the effect that the combination of said first identification information, second identification information and third identification information coincides with registration information managed by the server, said software is executed under the ordinary operating environment; if a registration result is received to the effect that the third identification information being unregistered in respect of any information processing terminal, registration of this third identification information was performed correctly, said software is executed under the ordinary operating environment, but if a registration result is received to the effect that said registration was not performed correctly, said software is executed under a restricted operating environment.

A server according to the present invention which achieves the third object is connected through a network with a plurality of information processing terminals that read prescribed software that is recorded on an information recording medium and execute this, and manages the operating environment of processing at these information processing terminals; it mutually associates and stores registration information including first identification information individually allocated to each information processing terminal, second identification information allocated beforehand to each type of software, and third identification information allocated to each said information recording medium in respect of software of the same type such that there is no overlap; and it receives a registration condition confirmation request including said first identification information and second identification information sent to this server by said information processing terminal as a processing step prior to execution of the software. As a result of looking up the registration information, it transmits a first checking result to the effect that said software is to be executed under the ordinary operating environment to the information processing terminal, if the combination of said first identification information and second identification information that is sent from said information processing terminal coincides with registration information; if this combination does not exist, it sends to said information processing terminal a second checking result seeking the registration of third identification information in respect of said information processing terminal. If a registration request for this identification information is received together with said third identification information, it again looks up the registration condition, and, if said third identification information that was sent from the information processing terminal is not associated and registered in respect of any other information processing terminal, associates and registers this third identification information with this information processing terminal and sends a first registration result to this information processing terminal to the effect that the software is to be executed under the ordinary operating environment and, if said third identification information is associated and registered in respect of some other information processing terminal, or if at least any one of said first identification information, second identification information or third identification information contains abnormality, sends to the information processing terminal a second registration result to the effect that said software is to be executed under a restricted operating environment.

As a preferred mode of the present invention, a server receives a registration condition confirmation request including first identification information, second identification information and third identification information sent to this over by an information processing terminal as a processing step prior to execution of the software, as a result of looking up said registration information, it transmits a checking result to the effect that said software is to be executed under the ordinary operating environment to said information processing terminal, if the combination of said first identification information, second identification information and third identification information that is sent from said information processing terminal coincides with registration information; if this combination does not exist, if said third identification information is not associated and registered in respect of any other information processing terminal, it associates and registers this third identification information with this information processing terminal and sends a first registration result to said information processing terminal to the effect that the software is to be executed under the ordinary operating environment; and, if said third identification information is associated and registered in respect of some other information processing terminal, or if at least any one of said first identification information, second identification information or third identification inflation contains abnormality, it sends to said information processing terminal a second registration result to the effect that said software is to be executed under a restricted operating environment.

A recording medium according to the present invention for achieving the above fourth object is a recording medium for a terminal or a recording medium for a server on which is recorded a procedure to cause a computer to function as an information processing terminal or as a server according to the present invention.

PREFERRED EMBODIMENT OF THE INVENTION

Embodiment 1

This embodiment relates to a technique whereby prescribed program processing content that is stored on the same information recording medium is changed as a result of license checking (for example, the processing content is changed so as to provide either a product version or a demo version). This embodiment is described below with reference to FIG. 1 to FIG. 6.

Construction of the Game Device

Figure 1:
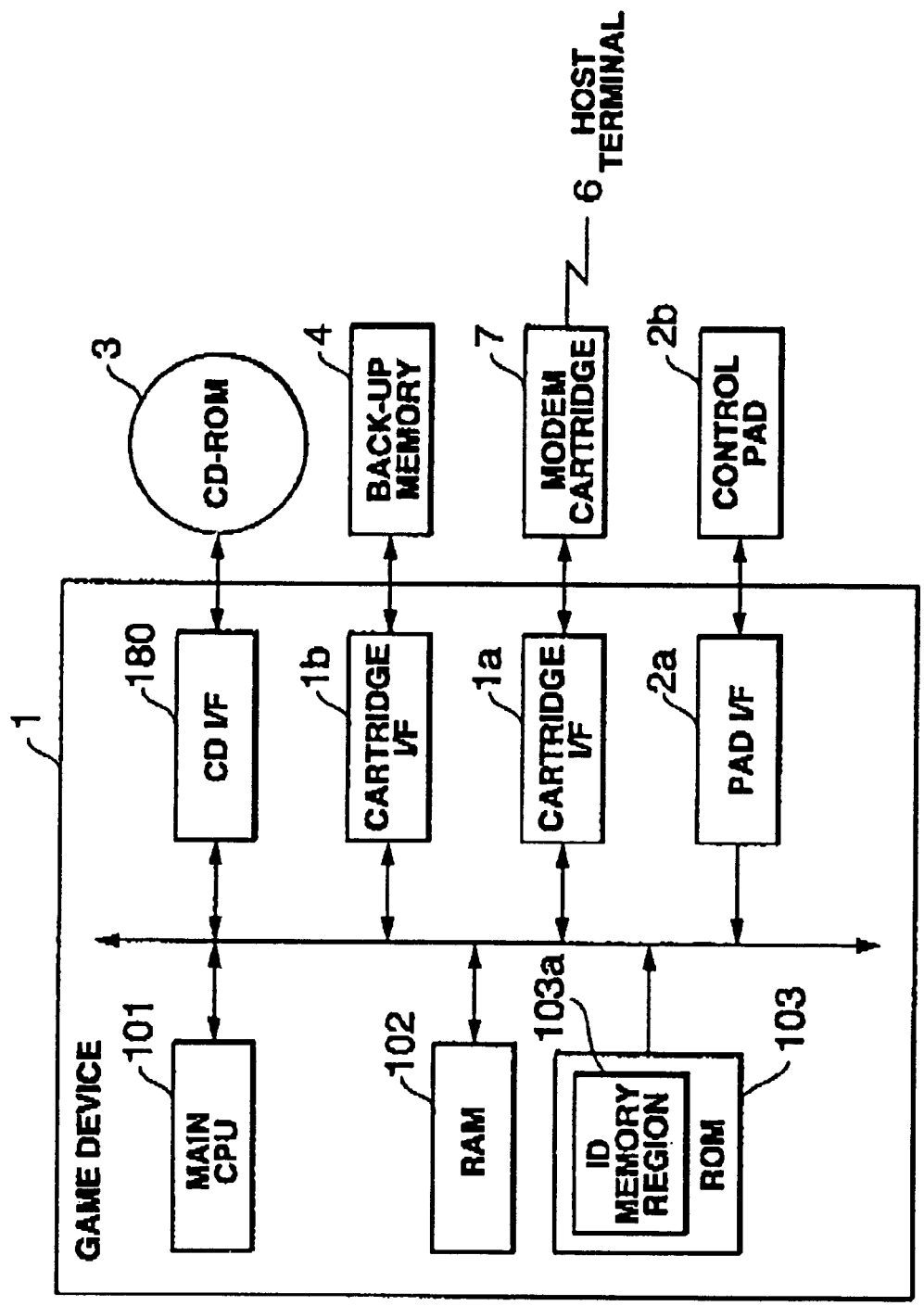
FIG. 1 is a functional block diagram of a game device according to an embodiment.

The construction of a game device 1 is described in outline with reference to FIG. 1. A game device 1 comprises: main CPU 101, RAM 102, ROM 103, CID I/F 180, cartridge I/Fs 1a, 1b, and PAT I/F 2a. When game device 1 is started up, an initial program for initialization processing that is stored on ROM 103 is started up. Also, an ID memory region 103a is secured in a prescribed recording region in ROM 103. In ID memory region 103a, there is stored identification information of game device 1 (for example, characteristic information of game device 1, such as its serial number). Main CPU 101 is connected to RAM 102 and ROM 103 through internal bus 105, and performs various control operations and/or calculation processing etc. Also, main CPU 101 reads and executes a program that is stored on CD ROM 3 through CD I/F 180 and internal bus 105. CD I/F 180 is the I/O interface of CD ROM 3. Main CPU 101 employs RAM 102 as a work area, and executes a game program in accordance with input data supplied from a control pad 2b through PAD I/F 28. The role in this embodiment of back-up memory 4 and modem cartridge 7 will be described later.

Figure 2:
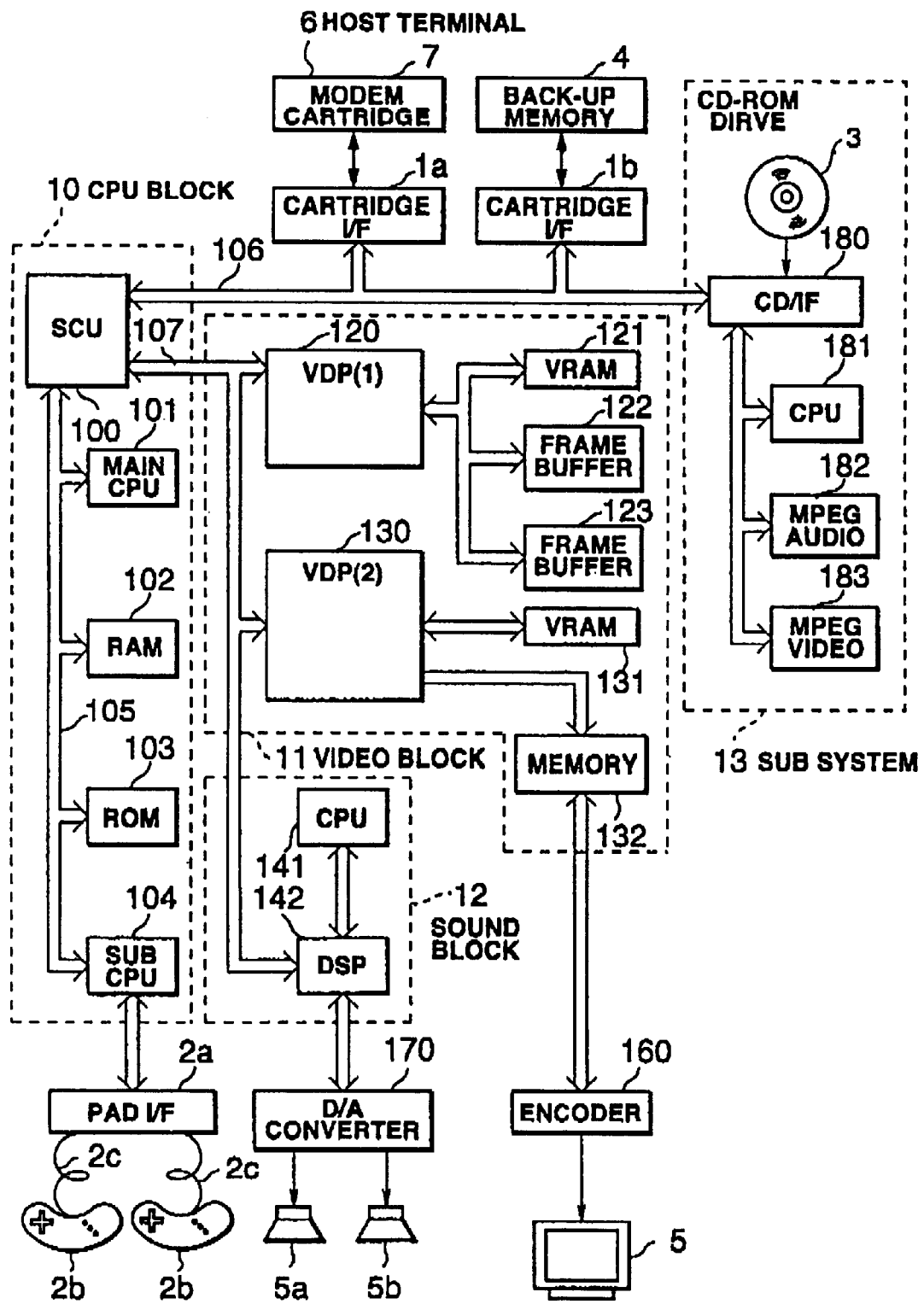
FIG. 2 is a detailed functional block diagram of a game device according to an embodiment.

Next, the construction of game device 1 will be described in detail with reference to FIG. 2. Game device 1 is constituted by CPU block 10 that performs control of the game device 1 as a whole, video block 11 that performs display control of the game screen, sound block 12 that generates effects sounds etc., and sub-system 13 that performs reading of CD ROM 3, etc.

CPU block 10 comprises an SCU (System Control Unit) 100, main CPU 101, RAM 102, ROM 103, cartridge I/F 1a, sub CPU 104, and CPU bus 105 etc.

Main CPU 101 exercises control over the device as a whole. This main CPU 101 is provided internally with a calculation function identical with a DSP (Digital Signal Processor), so that it can execute application software at high speed. RAM 102 is employed as a working area of main CPU 101. ROM 103 is divided into an ID memory region 103a described in FIG. 1 and a region in which is stored an initial program for initialization processing and/or a program for executing various other types of control.

SCU 100 controls buses 105, 106 and 107 so as to perform data input/output between main CPU 101 is VDPs 120, 130, DSP 140 and CPU 141 etc. in a smooth manner. Also, SCU 100 is provided in its interior with a DMA controller that is capable of transferring to a VRAM in video block 11 sprite data in the game. In this way, application software of a game etc. can be executed at high speed. Bus 106 is connected to cartridge I/Fs 1a, 1b. Modem cartridge 7 is connected to cartridge I/F 1a, and thereby acquires license information from host terminal 6 at the licenser end. The license information is stored in back-up memory 4 through cartridge I/F 1b under the control of SCU 100.

Apart from a "+" key, control pad 2b is provided with keys A B C and X Y Z Sub CPU 104 is called an SMPC (System Manager & Peripheral Control) and is provided with functions including that of collecting output data such as A B C keys from control pad 2b through PAD IN 2a in response to requests from main CPU 101.

It should be noted that not just a control pad 2b but any desired peripheral including for ample a joystick or a keyboard could be connected to PAT I/F 2a. Also, sub CPU 104 is provided with a function of automatically recognizing the type of peripheral connected to PAT I/F 2a (main unit terminal) and of collecting peripheral data etc., by a communication system dependent on the type of peripheral.

Video block 11 comprises a VDP (Video Display Processor) 120 that performs the drawing of characters etc. consisting of polygon data of a video game, and a VDP 130 that performs drawing of a background screen and synthesis and clipping processing of polygon image data and background images. VDP 120 is connected to VRAM 131 and frame buffers 122, 123. Polygon drawing data representing the characters of the video game device is sent from main. CPU 101 through SCU 100 to VDP 120, and is written in VRAM 121. The drawing data that is written in VRAM 121 is drawn to a frame buffer 122 or 123 for drawing in for example 16 bit/pixel form. The data of frame buffer 122 or 123 that is thus drawn is sent to VDP 130. Information to control the drawing is sent from main CPU 101 through SCU 100 to VDP 120. VDP 120 then executes drawing processing in accordance with these instructions.

VDP 130 is connected to VRAM 131 and has a construction whereby drawing data that is output from VDP 130 is output to encoder 160 through memory 132.

Encoder 160 generates a video signal by adding a synchronization signal etc. to this image data, and outputs this to television receiver 5.

Sound block 12 comprises a DSP 140 that performs audio synthesis in accordance with the PCM system or FM system and a CPU 141 that performs control etc. of this DSP 140. The audio data that is generated by DSP 140 is converted to a 2-channel signal by D/A converter 170, before being output to speaker 5b.

Sub system 13 comprises a CD ROM drive 1b, CD I/F 180 F, CPU 181, MPEG AUDIO 182, and MPEG VIDEO 183 etc. This sub system 13 is equipped with functions to perform for example reading of application software supplied in the form of a CD ROM, and to perform reproduction of video. CD ROM drive 1b reads data from the CD ROM. CPU 181 performs control of the CD ROM drive 1b, and processing such as error correction of the data that is thus read. The data that is read from the CD ROM is supplied to main CPU 101 through CD I/F 180, bus 106, and SCU 100, and is utilized as application software. Also, MPEG AUDIO 182 and MPEG VIDEO 183 are devices that restore data that has been compressed in accordance with the MPEG (Motion Picture Expert Group) standard.

Video reproduction on television receiver 5 can be performed by performing restoration of the MPEG compressed data that is written in CD-R2 shown in FIG. 1 using MPEG AUDIO 182 and MPEG VIDEO 183.

Explanation of the Operation of the Game Device

Next, an explanation of the operation of game device 1 will be given. When the user inserts a CD ROM 3 attached to a magazine supplement or like that he has purchased in a game device 1 to use this, CD ROM 3 first of all functions as the demo version. If the game on CD ROM 3 of this demo version appeals to the user, so that he wishes to use the product version, he requests a license from the licenser. In this case, the user transmits to the licenser the characteristic serial number of game device 1 and the product number of the game software, so that the necessary approval can be given. Also, the period of use and the use conditions etc. of the game program (for example, if the game software is to function as the product version, restrictive conditions etc. in regard to game program processing) are determined in the form of an agreement. When this is done, license information is supplied from the licenser to the user. This license information includes information to the effect that a license for the game software is granted, and, in addition, information specifying the period of use of the game program and/or use conditions etc. (license content information). The period of use of the game program and/or the conditions of use on game device 1 are restricted in accordance with this license content information. Also, this license information is information that is uniquely determined from the combination of the identification information of game device 1 and the identification information of the game software; even if the game software is the same, different license information would be supplied to a different game device. In other words, the license information is different for each game device and is different for each game software.

The license information is stored in back-up memory 4 by operation of the user's control pad 2b. However, regarding the type of license information that exists, since this is determined by the number of combinations of game device 1 and CD ROM 3, the amount of such information may be very large. Consequently, apart from the user himself storing the license information in back-up memory 4 by operation of control pad 2b, data input may also be effected from the host terminal 6 of the license through a communication circuit and modem cartridge 7. Preferably, in the transmission of this license information, transmission is effected in encrypted fashion, in order to prevent illicit use by a third party. It is also possible for the user to send identification information of game device 1 and identification information of CD ROM 3 to the licenser through the control circuit. If this is done, the aforesaid identification information can be transmitted to the licenser without letting the user know the identification information, by encrypting these two items of identification information.

Back-up memory 4 may be utilized for saving game data, in addition to the license information.

Furthermore, CD ROM 3 may store beforehand, apart from the game program, a license information confirmation program. This license information confirmation program is a program for determining, based on the identification information of game device 1, identification information of CD ROM 3, and license information is supplied by the licenser, whether CD ROM 3 is to function as the demo version or is to function as the product version. For example the serial number can be used as the identification information of game device 1. In this case, a numerical code of any desired number of digits could be used as the identification information, but, not restricted to this, a combination with any desired letter code could also be employed. The same applies to the identification information of CD ROM 3.

Figure 3:
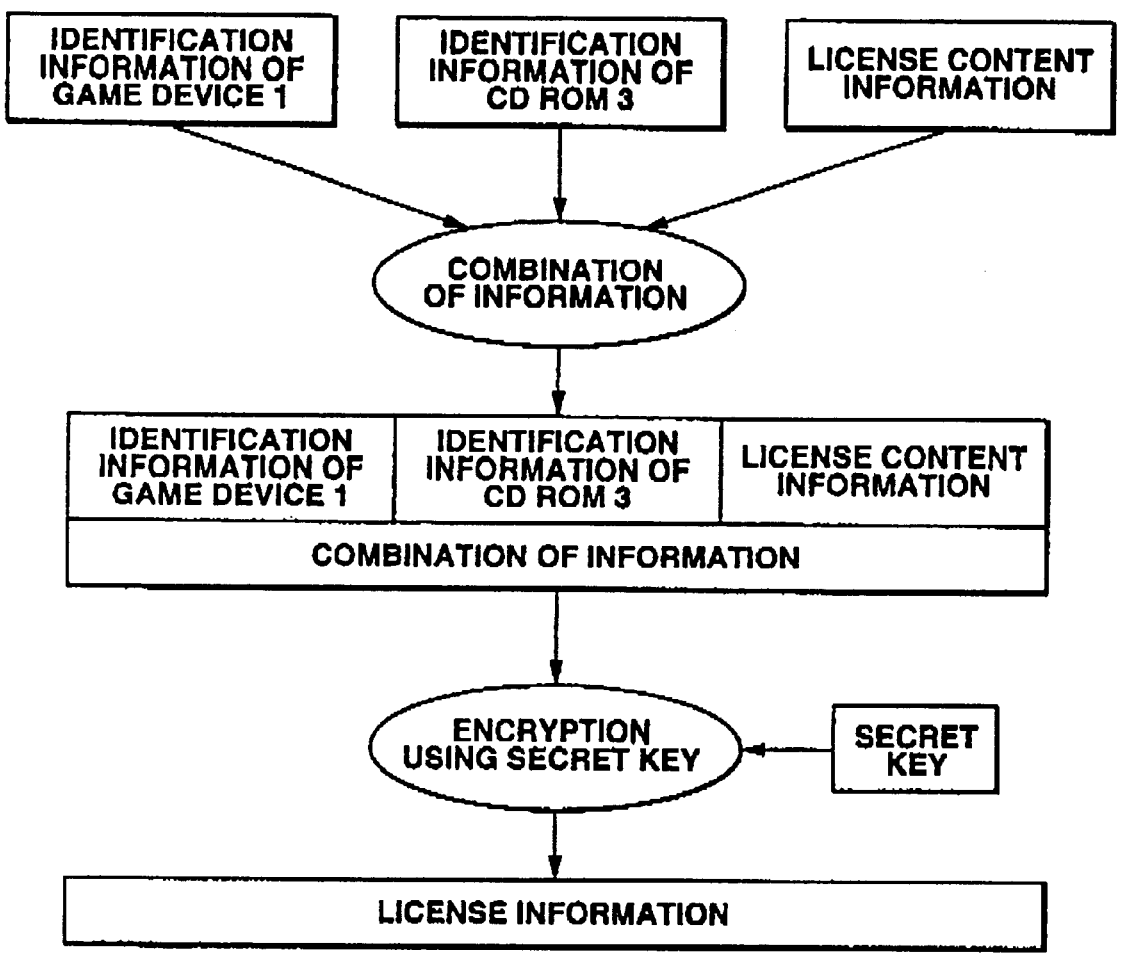
FIG. 3 is a view given in explanation of generation of license information.
Figure 4:
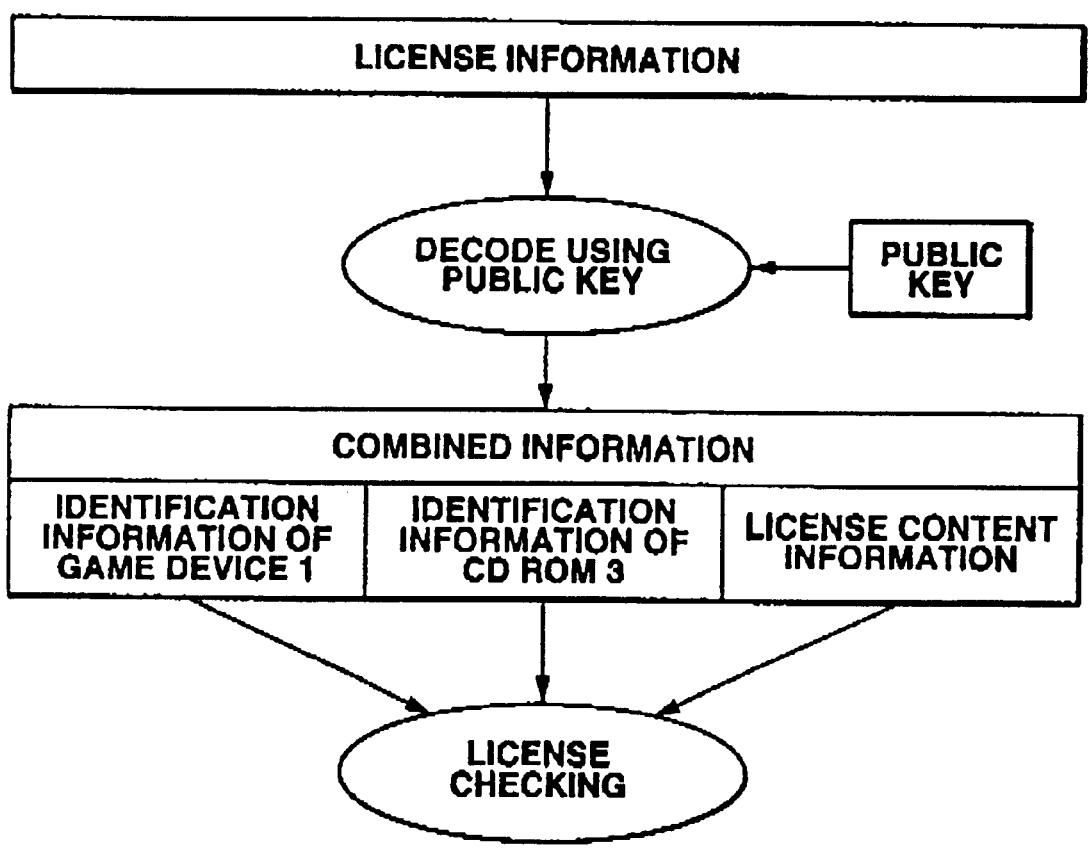
FIG. 4 is a view or given in explanation of restoration of license information.

Next, a procedure for generating and decoding license information will be described with reference to FIG. 3 and FIG. 4. FIG. 3 is a diagram of a procedure for generating license information using a public key encryption system and FIG. 4 is a diagram of a procedure for decoding the license information and comparing it with a license.

Procedure for Generating License Information

As described above, the licenser who issues the license determines the license content such as the period of use and use conditions of the game program in the agreement with the user. The information of the license content (32-bit binary data) is defined in correspondence with this license content. The data format of the information of the license content is determined beforehand in a prescribed form, such as that for example the most significant bits 32 to 29 determine the period of use of the game program, while the remaining bits 28 to 1 determine the license content, such as the conditions of use of the game program.

In order to generate the license information, as shown in FIG. 3, 96-bit information (hereinbelow called "combined information") is generated by combining identification information of game device 1 (32 bits), identification information of CD ROM 3 (32 bits) and information of license content (32 bits). This combined information could be directly sent to the user, but, preferably, in order to ensure secrecy of the license information, is sent in encrypted form. In this embodiment, the license information is obtained by encrypting the combined information using a secret key of an RSA encryption system (RSA crypto system). The license information which is thus obtained is transmitted to game device 1 through a communication circuit etc.

If the plain text of the combined information is represented by M and the cipher text of the license information is represented by C, a secret key and a public key can be found as follows.

Choosing two large prime numbers p and q, their product n=pq is found. By choosing an integer e that is below (p−1)(q−1) and is mutually prime with respect to (p−1)(q−1), an integer d can be found that satisfies:

$$e \times d \equiv 1 \bmod ((p-1)(q-1))$$

When this is done, (e, n) is a public key and (d, n) is a secret key.

In order to obtain the license information (cipher text C) by encrypting the combined information (plain text M) by the secret key, the calculation:

$$C = M^d \bmod n$$

is performed. On the other hand, in order to obtain the combined information (plain text M) by decoding the license information (cipher text C) by the public key, the calculation:

$$M = C^e \bmod n$$

is performed. In this embodiment, the public key is recorded beforehand in ROM 103 of game device 1 on CD ROM 3, and the secret key is privately held by the licenser. In order to find the secret key from the public key, it would be necessary to find p and q by prime factor decomposition of a, but, in fact, p and q are determined to be a few hundred bits, so, since prime factor decomposition of such an enormous number is currently incapable of execution within a practicable time, it is practically impossible to find the secret key. Illicit diversion of the license information can thereby be effectively prevented.

Procedure for Restoration of the License Information

As shown in FIG. 4, the license information is decoded by the public key which is recorded beforehand on ROM 103 of game device 1 or on CD ROM 3. The combined information is restored by this decoding. The identification information of game device 1 is stored in the most significant 96 to 65 bits of the restored combined information the identification information of CD ROM 3 is stored in the middle 64 to 33 bits, and the information of the license content is stored in the least significant 32 to 1 bits. License checking is performed using these respective items of information.

License Checking Procedure

Figure 5:
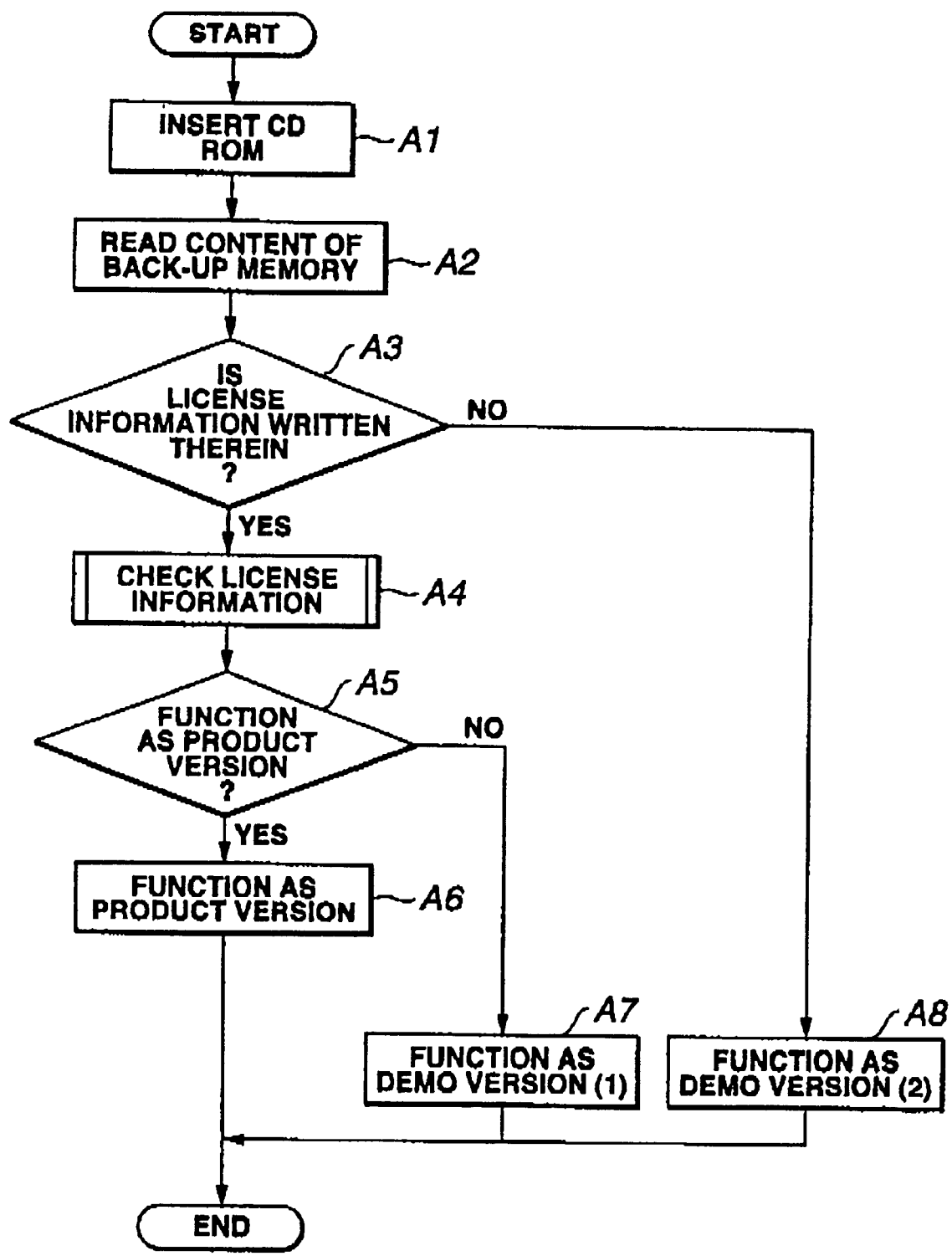
FIG. 5 is an overall flow chart of when license checking is performed.
Figure 6:
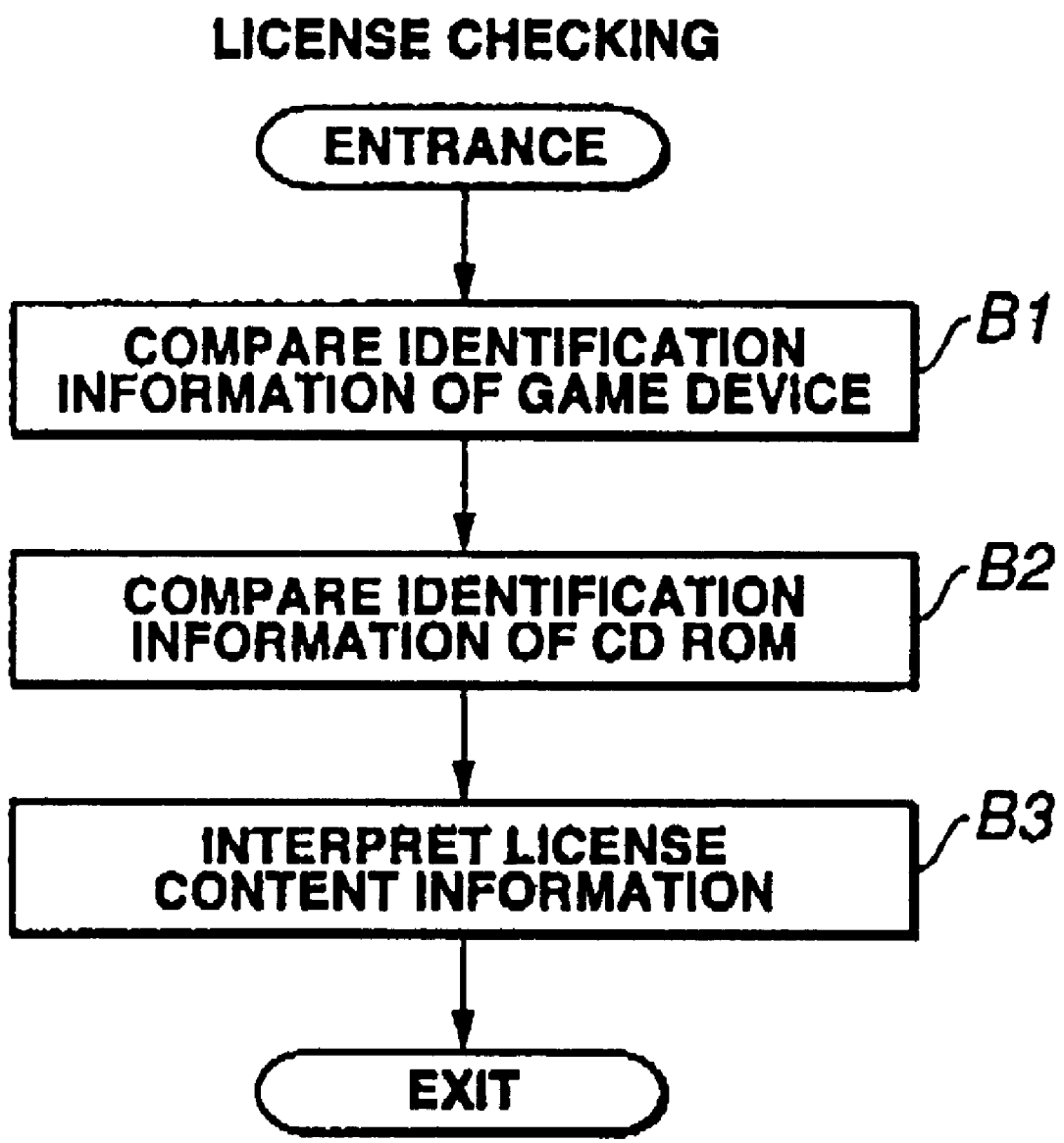
FIG. 6 is a flow chart of license checking.

The license checking procedure is described with reference to FIG. 5 and FIG. 6. CD ROM 3 on which is stored the game software is inserted into game device 1 (step A1). Main CPU 101 detects the fact that CD ROM 3 has been inserted through CD I/F 180, and reads the content of back-up memory (step A2). It then ascertains whether or not license information has been written into a prescribed storage region of the back-up memory (step A3); if license information has been written therein (step A3: YES), it performs license checking (step A4). If, as a result of the license checking it determines that this is to function as the product version (step A5: YES), CPU 101 then causes CD ROM 3 to function as the product version (step A6).

The various processing steps of license checking in step A4 will now be described with reference to FIG. 6. First of all, the identification information stored in ID memory region 103a of game device 1 and the identification information stored in the most significant 96 to 65 bits of the combined information restored by the public key are compared (step B1). Next, the identification information stored in a prescribed recording region of CD ROM 3 and the information stored in the intermediate 64 to 33 bits of the combined information are compared (step B2). Next, the license content information, which is stored in the least significant 32 to 1 bits of the combined information is read, and this is interpreted (step B3).

In step A5, a decision is made as follows on the basis of the results of execution of these processing steps (step B1 to step B3). If the identification information of game device 1 and the respective identification information of CD ROM 3 coincide, CD ROM 3 is made to function as the product version in accordance with the information of the license content. On the other hand, if the identification information of game device 1 and any of the items of identification information of CD ROM 3 do not coincide, or, if information to the effect that execution of the game program is restricted (information to the effect that this is to be made to function as a demo version) is written in the license content information, CD ROM 3 is made to function as demo version (1) (step A7: first restriction processing). As the content of this first restriction processing, there may be suitably set for example various restrictions concerning the number of stages of the game program, restrictions concerning the number of the characters that appear, restrictions concerning the operation processing of the characters, or restrictions regarding game time etc.

On the other hand, if no license information is written in back-up memory 4 (step A3: NO), main CPU 101 causes CD ROM 3 to function as the demo version (2) (step A8: second restriction processing). This second restriction processing is performed for example when the user has purchased CD ROM 3 and executes the game program by inserting this into game device 1 for the first time. Thus, the first restriction processing and second restriction processing could be different processing or could have the same processing content.

Apart from being stored in a prescribed storage region of CD ROM 3, the license information confirmation program may be stored in a prescribed storage region of ROM 103 for each game program.

Also, as the public key code, apart from RSA encryption, there could be employed McLeish encryption, utilizing the difficulty of code for error correction, Elgamel code utilizing the difficulty of logarithmic calculation in a remainder calculation etc., MI encryption utilizing the difficulty of solving multi-variable multi-dimensional simultaneous equations, or elliptic encryption etc. in which RSA encryption is reconstructed by using calculation defined on an elliptical curve.

Thus, as described above, with this embodiment, media on which identical information is recorded can be made to function as the product version in accordance with the license information or as the demo version; thus, there is no need to create a demo version separate from the product version, thereby enabling production costs to be lowered. Furthermore, from the point of view of the licenser, there is no need to distinguish the product version from the demo version in inventory management, so inventory management is simplified. Also, from the point of view of the user, there is the advantage that the demo version game software can be immediately used as the product version by acquiring the license information. There is therefore no need to wait for delivery of the product version.

Furthermore, since the license information is different for each game device and is different for each item of game software, it is possible to prevent illicit use of game software, since, even for the same game software item, its use can be prevented on a game device in respect of which a license has not been obtained. That is, illicit use by a third party using an illicit copy of the license information can be effectively prevented by employing license checking of the identification information of the game device.

Also, by writing license information in externally attached back-up memory, it is possible to allocate different back-up memory to different items of game software, so that the game software items can be used together in integrated fashion. In this way, there is no need for the game device to store license information for each item of game software, thereby making it possible to utilize hardware resources more effectively. In particular, this is effective when the license information comprises a large amount of data. Also, game date can be saved in free capacity of the back-up memory.

Also, secrecy of the identification information can be ensured by transmitting the identification information in encrypted form when the identification information of the game device and the game software is respectively transmitted to the licenser. Specifically, with this embodiment, a security system can be constructed that prevents illicit use of game software.

The information recording medium on which the game software is recorded is not restricted to being a CD ROM but my be for example a game cartridge, CD-R, DVD ROM, DVD RAM, ROM cartridge, magneto-optic disc, magnetic tape, or RAM cartridge with a battery back-up, flash memory cartridge, or non-volatile memory cartridge. Also, it could be a communication medium such as a wired communication medium such as a telephone circuit or a wireless communication medium such as a microwave circuit. The Internet is also included in communication media as referred to herein.

Also, although, in this embodiment, a game device has been described as an example of an information processing device, there is no restriction to game devices, and the design could be suitably modified for for example CD reproduction devices, LD reproduction devices, or video reproduction devices etc.

Embodiment 2

This embodiment relates to a technique whereby, by utilizing a communication system, it is decided whether a game recording medium is being employed on the user's own game device or is being employed on another game device, and the setting of the content of game program processing is altered in accordance with the result of this decision. This is achieved by centralized management on a server of the correspondence relationship of the game device (information processing terminal) and the game program (i.e. the game program which is recorded on the game recording medium. This may also be simply referred to as the "software" or "application".). This embodiment is described below with reference to FIG. 7 to FIG. 11.

Figure 7:
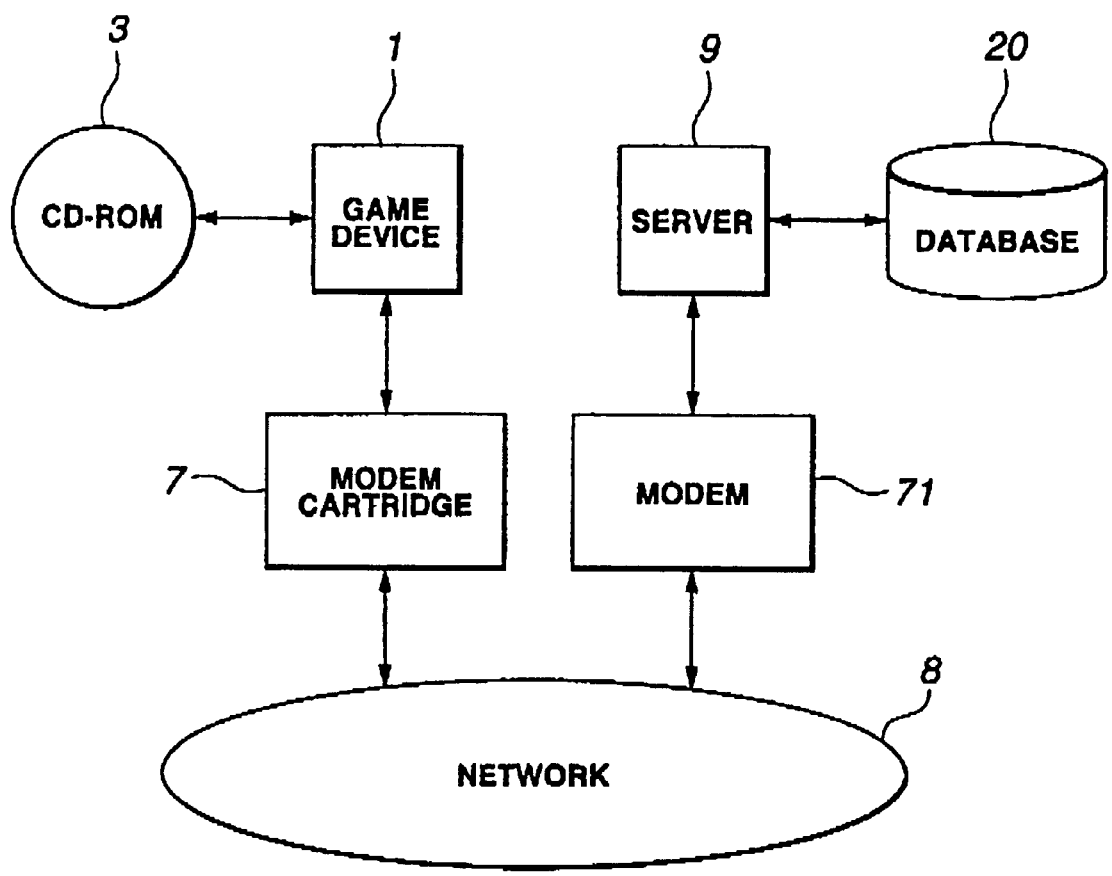
FIG. 7 is a layout diagram of a complete information processing system.

FIG. 7 is a layout diagram of the entire information processing system (also referred to as "security system"). Game device 1 is connected to a server 9 through a modem cartridge 7 and network 8. A game device 1 and modem cartridge 7 are of the same construction as in the case of Embodiment 1. Network 8 is a communication network and may include a dedicated line such as an ISDN circuit or a public circuit. Server 9 is a connected to network 8 by means of modem 71 and is arranged to be capable of connection with a plurality of game devices 1 through the same network. Also, a server 9 holds a large-capacity data base 20 and manages the operating environment of game devices 1 and furthermore sets their operating environments by deciding whether or not the game recording medium is being processed solely on the user's own game device, by using various registration information that is registered in database 20. The details of the registration information will be described later. Also, server 9 is capable of implementing the aforesaid decision in respect of the individual games devices 1 by communication with the plurality of game devices 1.

Game device 1 comprises internally a main CPU 101, RAM 102, ROM 103, CD I/F 180, and cartridge I/Fs 1*a*, 1*b* etc. A software ID and software SN (serial number) are allocated beforehand to the game program that is stored on CD ROM 3. In this specification, the "software ID" is defined as identification information that is allocated to each game title (each type of game software). For example, software ID "001011" may be allocated in respect of game A, while software ID "110010", . . . may be allocated in respect of game B. Thus, even though the game recording medium may be different, if the game title is the same, the same game ID will be allocated. Also, the software SN is defined as identification information that is allocated to each game recording medium, for games of the same title. There will therefore exist a number of software SNs equal in number to the number of game recording media. For example, software SN "10110111" may be allocated to the game software recorded on game recording medium A while software SN "10111000", . . . , is allocated to the game software stored on game recording medium B. Also, as already described with reference to Embodiment 1, individual identification information is stored on each game device 1 in ID memory region 103*a* of ROM 103 (in this embodiment, this is referred to as the game device ID). As these items of identification information, any desired letter code such as numerals, letters of the alphabet, or symbols could be employed.

Figure 8:
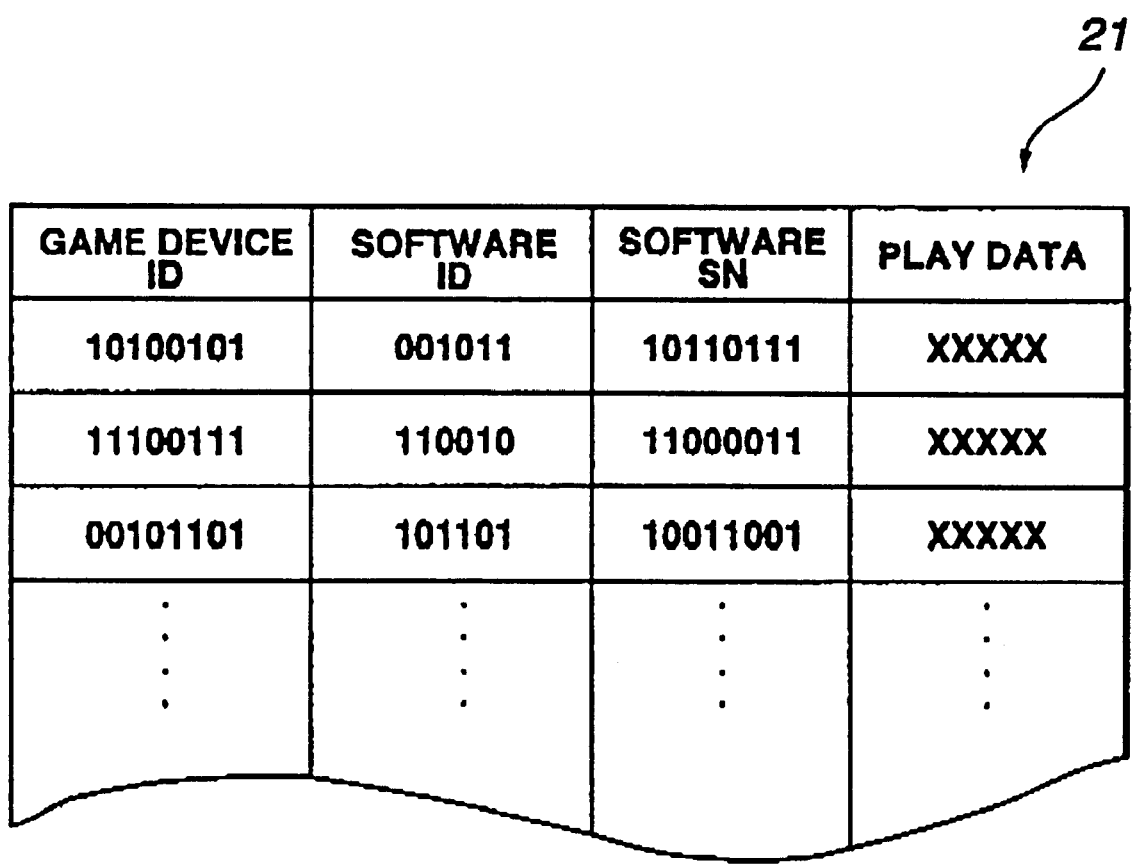
FIG. 8 is a table of registration information managed by a server.

As shown in FIG. 8, in data base 20 of server 9, the software ID of the game program that was the subject of game execution processing in each game device and the software SN are mutually associated and registered in the form of a table. This table 21 is defined as the registration information. The registration information may be registered linked with play data in each game program. The "play data" means various types of setting information for when the user plays the game, such as for example information regarding the number of stages that the user has cleared, points acquired, or playing time etc.

Figure 9:
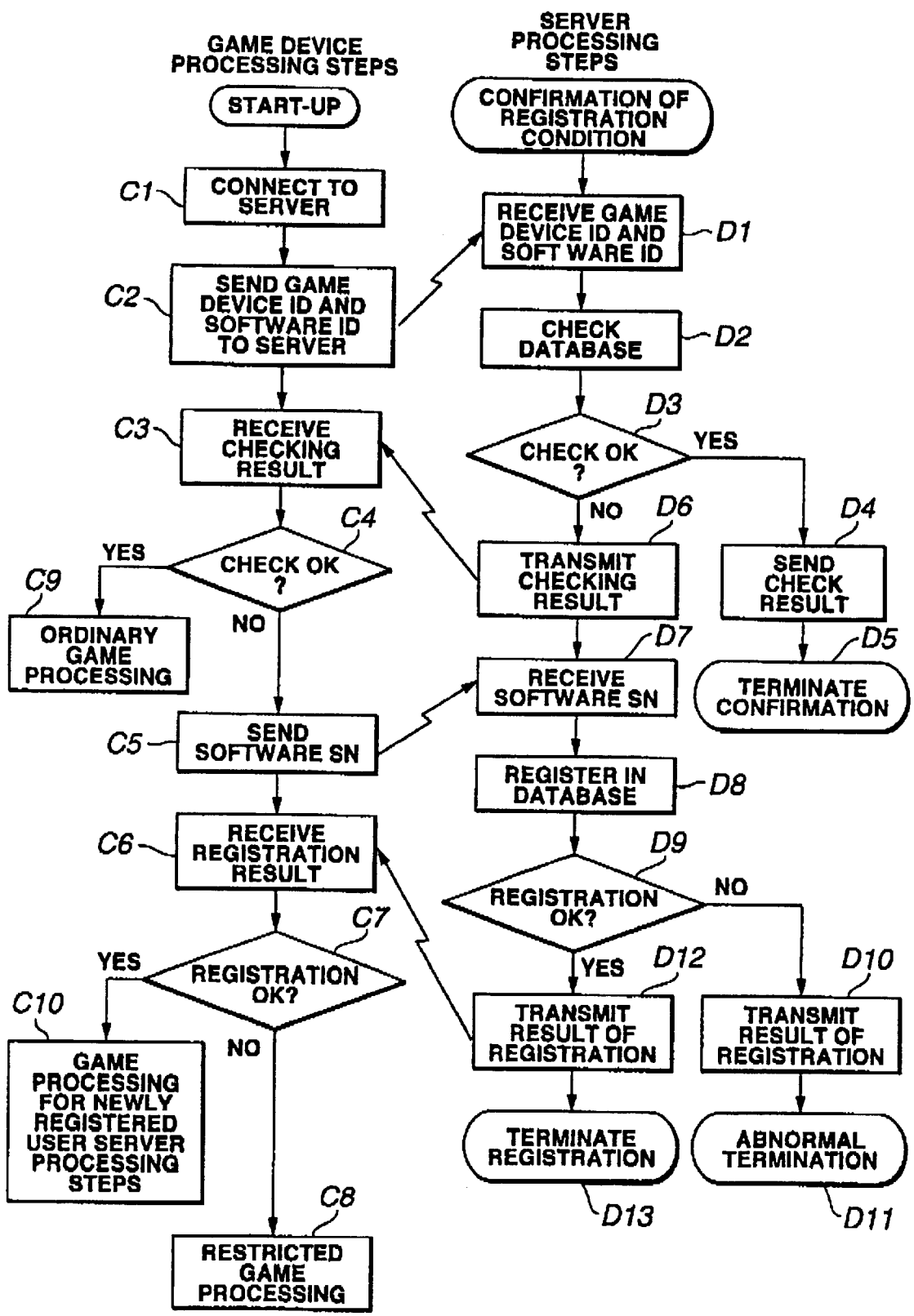
FIG. 9 is a flow chart showing processing procedures of the game device and the server.

Next, the processing steps of the present invention will be described with reference to FIG. 9. This Figure shows the processing steps that are respectively performed by the game device and the server. When the power source of game device 1 is connected to start up the game device, game device 1 is connected with server 9 (step C1) by a pre-set procedure. Server 9 then enters registration information confirmation mode and goes into a condition waiting for external input. When connection is completed, game device 1 reads the game device ID from ID memory region 103*a*, and reads the software ID from the game recording medium. Also, it sends the game device ID and software ID to server 9 and makes a request for confirmation of the registration information (step C2). A request for confirmation of registration information means an inquiry of the server as to whether or not the game device ID and software ID coincide, so as to confirm whether the game program that is registered on the game recording medium is being used solely in respect of the user's own game device or is being used on another game device. Server 9 receives the game device ID and software ID (step D1), and checks these with the registration information that is registered in data base 20 (step D2).

If, as a result of the checking it, it is found that the combination of the game device ID and software ID that is transmitted from game device 1 coincides with the registration information that is registered in data base 20 (step D3: YES), this checking result is transmitted to game device 1 (step D4), and registration information confirmation mode is terminated (step D5). On the other hand, if the combination of game device ID and software ID that is transmitted from game device 1 is not registered in data base 20 (step D3: NO), a checking result to that effect is transmitted to game device 1 (step D6).

When game device 1 receives the checking result that is transmitted from server 9 (step C3), it decides whether the game device ID and software ID are registered or are not registered (step C4). If they are registered i.e. if the user is a registered user (step C4: YES), game processing is performed under the ordinary operating environment (step C9).

In contrast, if it is not registered (step C4: NO), game device 1 requests the user to input the software SN, transmits this software SN that is thus input to server 9, and requests registration of the software SN (step C5). When server 9 receives the software SN (step D7), it registers this in data base 20 (step D8). When this is done, if the software SN cannot be properly registered, for a reason such as that the software SN is already registered in respect of another game device (step D9: NO), this registration result is transmitted to game device 1 (step D10), and registration information confirmation mode is terminated (step D11). On the other hand, if it proves possible to register the software SN correctly in the database (step D9: YES), the registration report to that effect is transmitted to game device 1 (step D12), and registration information confirmation mode is terminated (step D13).

When game device 1 receives the registration result that is transmitted from server 9 (step C6), it decides whether registration has been performed correctly or not (step C7). If registration has been correctly performed i.e. if the user is a newly registered user (step C7: YES), game processing is performed under the operating environment that is set beforehand for newly registered users (step C10). Game processing under an operating environment that is set for newly registered users may include for example display on the screen of a message to the effect that a new registration has been performed; or processing to display messages to the effect that if a game recording medium used in another game device is employed in the user's own game device, the operating environment settings may be altered, or to urge caution in that the game must not be played by obtaining a software SN etc. by illicit means. Of course, such processing could be dispensed with, and the same processing as in the case of ordinary game processing (step C9) could be performed.

In contrast, when registration has not been performed correctly (step C7: NO), game processing is conducted under the restricted operating environment (step C8). A restricted operating environment means for example that setting is effected such that the number of game stages is decreased, effects sounds are eliminated, operation of the player characters is slowed down, or the playing time is shortened, . . . , etc. Also, as a restricted game, it may be arranged for a previously prepared demo version of the game to be executed.

Consequently, according to the present invention, since it is possible to decide, by using a server to manage registration information of all the game devices, whether the game recording medium is being employed in the user's own game device or is being employed in another game device, it is possible to prevent processing, by illicit means such as rewriting the identification information, whereby a game recording medium that was employed in another game device is employed as if it were used solely in the user's own game device. In particular, whereas, with the technique of Laid-open Japanese Patent Publication No. H. 11-53183, management of the game recording media must be performed individually, making control of illicit actions difficult, with the present invention, thanks to the use of registration information accumulated in a data base, control of all the game recording media can easily be performed.

Also, when the user uses a new game program, the game device ID and software ID and software SN are automatically associated and registered, so if a third party employs a game device that had been used in another user's game device in his own game device, the registration information will not coincide at the server end, so the operating environment of the game can be made to be restricted.

Furthermore, little trouble is required in the event of redistribution in the market of so-called second-hand products, since it suffices simply to rewrite the registration information registered in the data base, or to issue a fresh software SN. It is also possible to collect a fee from the user to rewrite the registration information.

Also, although, in the above description, the game device ID was employed as the identification information of the game device, any identification information allocated to each user which is mutually different between users could be employed such as for example a user ID (user's individual number) issued by the server manager, or even a telephone number.

Figure 10:
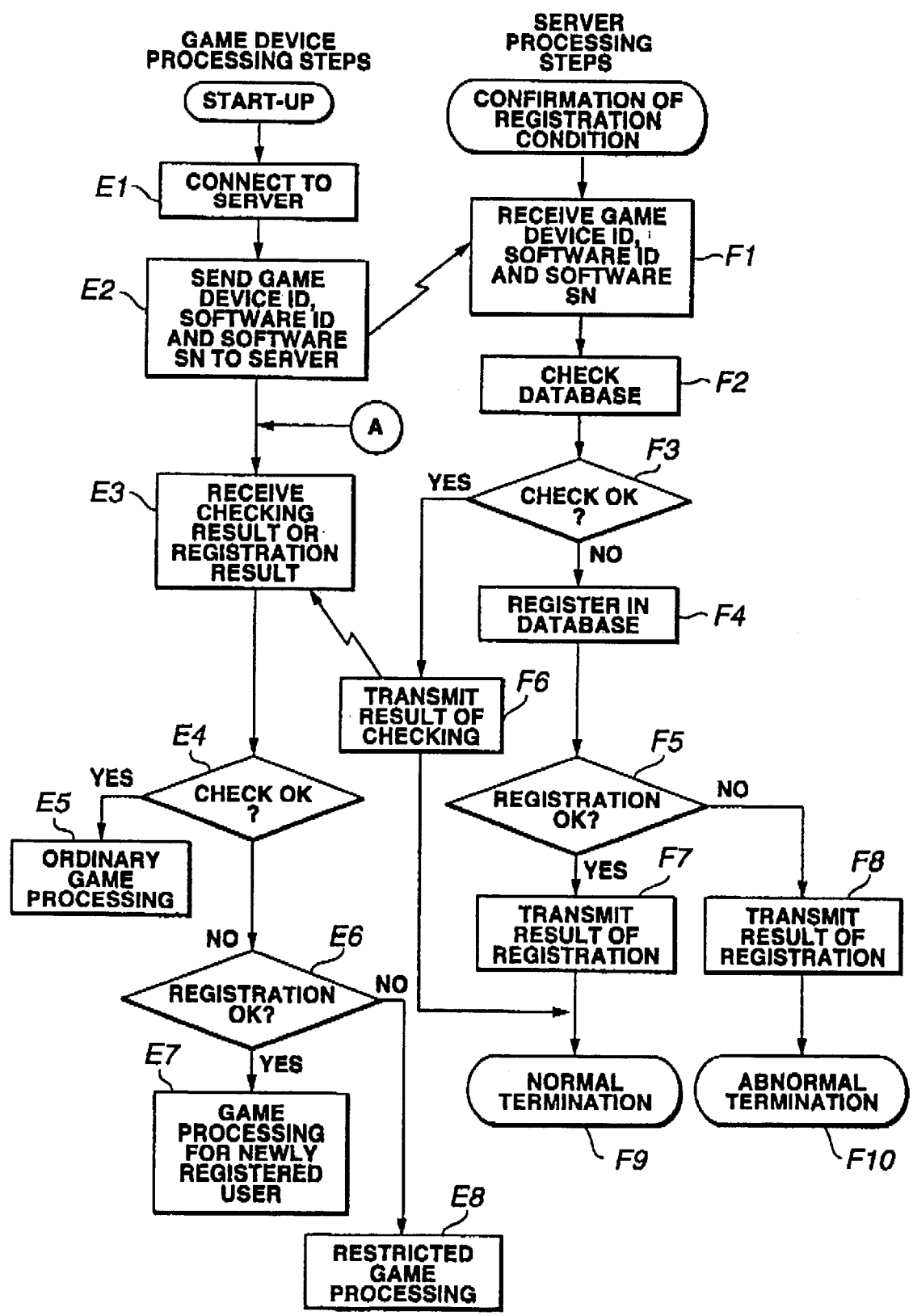
FIG. 10 is a flow chart showing processing procedures of the game device and the server.

It should be noted that, although, in the above examples, when the registration information of the database was checked, game device 1 sent only the game device ID and software ID to server 9, it could be arranged for the transmission to include simultaneously the software SN. FIG. 10 shows the respective processing steps executed by game device 1 and server 9 in these circumstances. The basic processing steps are the same as the processing steps shown in FIG. 9. When the game device 1 is started up, connection to server 9 is effected (step E1) by a predetermined procedure. Then, the game device ID, software ID and software SN are sent to server 9 and registration information confirmation is requested (step E2). For the software SN, that directly input by the user when game device 1 was started up is employed. Server 9 receives the game device ID, software ID and software SN (step F1) and checks the database (step F2). When checking data base 20, it would be satisfactory to simply check the game device ID and software ID as described in the previous embodiment, but it is also possible to effect look-up and checking using a combination of game device ID, software ID and software SN. If, as a result of the checking, it is found that the software ID and software SN of the game recording medium agree with the combination of game device ID (step F3: YES), this checking result is sent to game device 1 (step F6), and the registration condition confirmation mode terminates normally (step F9).

On the other hand, if the software ID or software SN is unregistered in respect of the game device ID (step F3: NO), this is registered in database 20 (step F4). If the software S is not associated and registered in respect of any other game device (step F5: YES), the software SN is then associated and registered with the game device 1 in question, and this registration result is transmitted to game device 1 (step F7). If, because of a reason such as that the software SN has been associated and registered in respect of any other game device, correct registration of the software SN cannot be achieved (step F5: NO), this registration result is sent to game device 1 (step F8), and the registration information confirmation mode is terminated (step F10).

When game device 1 receives the checking result or registration result from server 9 (step E3), it evaluates this checking result or registration result. If the combination of game ID, software ID and software SN agrees i.e. if the user is a registered user (step E4: YES), ordinary game processing is performed (step E5). On the other hand, in the case of an unregistered user (step E4: NO), if registration of the software SN is performed normally i.e. in the case of a newly registered user (step E6: YES), game processing is performed under the operating environment that is set beforehand for newly registered users (step E7). Game processing under the operating environment that is set for newly registered users is the same as described above, but could be identical with that of ordinary game processing (step E5).

Also, if the software SN cannot be associated and registered with the game device ID of the user's game device (step E6: NO), due to reasons such as the user not being registered (step E4: NO), the software SN being registered to another game device, or suspicion that the software SN has been input by illicit means (where the number of times of input of the software SN is more than necessary) etc., game processing is performed under the restricted operating environment (step E8).

Figure 11:
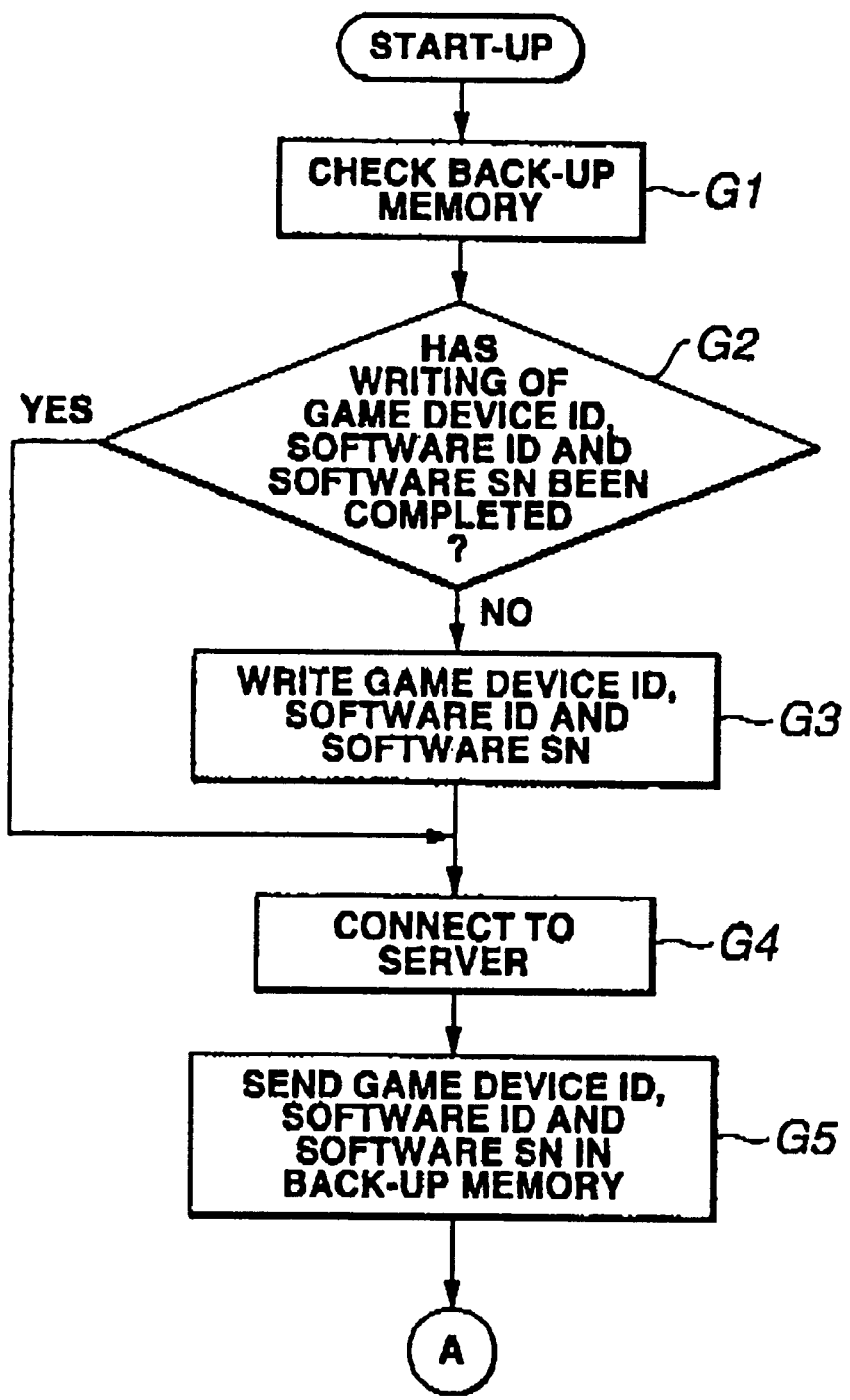
FIG. 11 is a flow chart showing processing procedures of the game device and the server.

Although, in the above description, in the processing step of the game device 1, the software SN that was input by the user was employed in transmission of the software SN to server 9, it would be possible to arrange for the software SN, software ID and game device ID to be stored beforehand in back-up memory, these being then read by game device 1 and transmitted to server 9. The processing step of game device 1 in this case is shown in FIG. 11. When the game device 1 is started up, game device 1 checks back-up memory 4 (step G1). If the game device ID, software ID and software SN are not written therein (step G2: NO), game device 1 writes the game device ID, software ID and software SN in back-up memory 4 (step G3) and connects to server 9 (step G4). And if the game device ID, software ID and software SN are written therein (step G2: YES), connection is effected to server 9 (step G4). When connection to server 9 is completed, the data in back-up memory 4 (game device ID, software ID and software SN) are sent to server 9, and a request for registration information confirmation is made (step G5). Subsequently, the processing of step E3 to step E6 of FIG. 10 is executed.

When the game device ID, software ID and software SN are transmitted from the game device to the server, the construction may be such that transmission of these items of identification information is effected in pre-encoded form using RSA encryption, McLeish encryption, Elgamel coding, or MI encryption.

Also, although, in this embodiment, a game device was described as an example of an information processing terminal, this could be applied not merely to game devices but also to CD reproduction devices, LD reproduction devices, or video reproduction devices etc., by making suitable design modifications.

INDUSTRIAL APPLICABILITY

With the information processing device and information processing method according to the present invention, it is possible to alter the processing content of a program that is stored on the same information recording medium by a simple arrangement. Consequently, there is no need to manufacture information recording media for each function, thereby making it possible to lower production costs. Also, illicit use of the information recording media by third parties can be effectively prevented.

Furthermore, with an information processing system, information processing terminal and server according to the present invention, by a simple arrangement, it is possible to ascertain whether or not the software that is recorded on the information recording medium is being processed by the user's own information processing terminal, and to alter the content of processing of the software in accordance with the result that is thus found. In particular, since the registration information of all the information processing terminals is managed by the server, it is possible to prevent illicit actions by tampering etc. with the identification information, and it is possible to alter the setting of the operating environment at each information processing terminal by for example rewriting the registration information.

Also, with a recording medium for a terminal or recording medium for a server according to the present invention, a computer can be made to function as an information processing terminal or server according to the present invention.

What is claimed is:

1. An information processing device comprising:

first storage means storing first identification information that is individual to said information processing device;

an interface apparatus via which an information recording medium is connectable or mountable, wherein said information recording medium is recorded with a software content and allocated with second identification information that is individual to said information recording medium; and second storage means which is adapted to store a license information provided by a licenser of said software content, said license information including information defining a licensed condition, in accordance with which the software content is executed on the information processing device, in association with said first and second indentification information;

wherein the sofware content is executed on said information processing device in accordance with said licensed condition when both of said first and second identification information are found in said license information; or wherein the software content is executed on said information processing device with a restriction in which partial functions of said software content are restricted when at least one of said first and second identification information is not found in said license information.

2. The information processing device of claim 1 wherein said licensed condition includes a period of use or condition of use of the sofware content stored on said information recording medium.

3. The information processing device of claim 1 wherein said license information is sent to said information processing device from a terminal device at the licenser through a communication network.

4. The information processing device of claim 3 wherein said license information is sent to said information processing device in an encrypted form.

5. The information processing device of claim 1 wherein said second storage apparatus is a portable recording medium externally mounted on said information processing device.

6. The information processing device of claim 5 wherein said externally mounted portable recording medium is a back-up memory.

7. The information processing device of claim 1 wherein said information recording medium is stored with a game program.

8. An information processing method comprising the steps of:
  determining whether license information is stored on an information processing device which is supplied with a software content from an information medium, wherein said license information is provided by a licenser of the software content and includes first identification information individual to said information processing device, second identification information individual to said information medium and a licensed condition in accordance with which the software content is executed on the information processing device;
  executing the software content on said information processing device in accordance with said licensed condition when both of said first and second identification information are found in said license information; or
  executing the software content on said information processing device with restriction in which partial functions of said software content are restricted when the license information is not found on said information processing device or when at least one of said first and the second identification information is not found in said license information.

9. The information processing method of claim 8 wherein said licensed condition includes a period of use or condition of use of the software content stored on said information recording medium.

10. The information processing method of claim 8 wherein said first and second identification information is supplied to a terminal device at the licenser through a communication network and said license information is provided to said information processing device from said terminal device at the licenser through a communication network.

11. The information processing method of claim 10 wherein said first and second identification information and said license information are transmitted in an encrypted form on the communication network.

12. The information processing method of claim 8 wherein said second storage means is a portable recording medium externally mounted on said information processing device.

13. The information processing method of claim 12 wherein said externally mounted portable recording medium is a back-up memory.

14. The information processing method of claim 8 wherein said information recording medium is stored with a game program.

15. An information recording medium stored with a program to cause an information processing device to execute an information processing method of claim 8.

16. The information recording medium of claim 15 wherein said licensed condition includes the period of use or condition of use of the software content stored on said information recording medium.

17. The information recording medium of claim 15 wherein said software content is a game program.

18. An information processing system comprising:
  a server at a licenser of a software content;
  a network connection via which a plurality of information processing terminals, at users of the software content, are connectable or mountable to said server, wherein each of said plurality of information processing terminals is supplied with the software content from an information storage medium; and
  a data-base coupled to said server,
  wherein said data-base is stored with registration information in which first identification information that is individual to each information processing terminal is recorded in association with second identification information that is allocated to the software content and in association with third identification information that is allocated to the information storage medium,
  wherein an information processing terminal, transmits its first identification information, the second identification information and a request for a registration confirmation to said server,
  wherein, upon receiving said request for registration confirmation, the server looks up the registration information in the data-base, and, if a combination of said first and second identification information is found in the registration information, sends to said information processing terminal a first checking result, or sends a second checking result if said combination is not found in the data-base,
  wherein once the information processing terminal receives said first checking result, the information processing terminal is allowed to execute said software content under the ordinary operating enviroment,
  wherein once the information processing terminal receives said second checking result, the information processing terminal sends the third identification allocated to the information storage medium connected or mounted thereto and requests the server to register the third identification information in association with the first and second identification information in respect to the information processing terminal,
  wherein, upon receiving the third identification information registration request, the server looks up a registration condition and, if said third identification information transmitted from the information processing terminal is registered in association with any other information processing terminal, the server registers the third identification information in association with said information processing terminal, and sends a first registration result to said information processing terminal, and, if said third identification information is registered in association with any other information processing terminal, or if there is abnormality in at least any one of the first, second or third identification information, the server sends a second registration result to said information processing terminal, wherein said information processing terminal, which has received the first registration result, is allowed to execute said software content under the ordinary operating environment, wherein said information processing terminal, which has received said second registration result, is allowed to execute said software content under a restricted operating environment.

19. An information processing system comprising:

a server at a licensor of a software content;

a network connection via which a plurality of information processing terminals, at a user software content, are connectable to said server, wherein each of said plurality of information processing terminals is supplied with the software content from an information storage medium; and a data-base coupled to said server, wherein said data-base contains registration information in which first identification information that is individual to each information processing terminal is recorded in association with second identification information that is allocated to the software content and in association with third identification information that is allocated to the information storage medium;

wherein an information processing terminal transmits to said server its first identification information, said second identification information and the third identification information allocated to the information storage medium connected or mounted to said information processing terminal, together with a request for a registration confirmation, wherein, upon receiving said request for registration confirmation, the server looks up the registration information in the data-base, and;

sends to said information processing terminal a checking result if a combination of said first and second identification information is found in the registration information, or, registers the third identification information in association with the first identification information of said information processing terminal in said data-base, and sends a first registration result to said information processing terminal if said combination is not found in the data-base and if said third identification information is not associated and registered in respect to any other information processing terminal, or, send a second registration result to said information processing terminal if said third information is registered in association with any other information processing terminal, or if there is abnormally in at least any one of said first, second and third identification information, wherein said information processing terminal, which has received said checking result or first registration result, executes said software content under an ordinary operating environment, or wherein said information processing terminal, which has received said second registration result, executes said software content under a restricted operating environment.

20. An information processing terminal that executes a software content read from an information storage medium comprising:

an interface apparatus in which an information storage medium is connectable or mountable; and a network connection apparatus connectable to a server via a communication network, wherein said server stores registration information in respect to a plurality of information processing terminals, wherein a first identification information individual to a respective one of the information processing terminals is recorded in association with a second identification information allocated to the software content and a third identification information allocated to the software content and a third identification information allocated to an individual information storage medium;

wherein the information processing terminal sends its first identification information and the second identification information with a request for registration confirmation to the server through the communication network, wherein, in response to said request, the server determines if the combination of said first and second identification information is found in the registration information, and sends back a checking result to the information processing terminal, wherein said information processing device, once having received from the server a checking result that such combination is found in the registration information, is allowed to execute said software content under an ordinary operating environment, wherein said information processing terminal, when having received a checking result that such combination does not exist on the server, sends a third identification information, which is allocated to the individual information storage medium from which the software content is read into said information processing terminal, together with a request for registration of the third identification information to the server, wherein, if received from the server a registration result that registration was performed correctly, the information processing device is allowed to execute said software content under the ordinary operating environment, wherein, if received from the server a registration result that the registration result was not performed correctly, the information processing device is allowed to execute said software content under a restricted operating environment.

21. An information processing terminal that executes a software content read from an information storage medium, comprising:

an interface connection apparatus in which the information storage medium is connectable or mountable; and a network connection apparatus connectable to a server via a communication network;

wherein said server stores registration information in respect to a plurality of information processing terminals, wherein a first identification information individual to a respective one of the information processing terminals is recorded in association with second identification information allocated to the software content and a third identification information allocated to an individual information storage medium, wherein the information processing terminal sends its first identification information, the second identification information and the third identification information, which is allocated to the individual information storage medium from which the software content is read into said information processing terminal, together with a request for registration confirmation to the server through a communication network, wherein, in response to said request, the server determines if the combination of said first, second and third identification information is found in registration information on the server, and sends back a checking result to the information processing terminal, wherein, said server, when it is determined that such combination is not found but that the third identification information is unregistered in respect of any information processing terminals, registers the third identification information in association with said first and second identification information and sends back to said information processing terminal a registration result that registration of the third identification information was performed correctly, wherein, the information processing terminal, when having received from the server a checking result that such combination is found in the registration information, or a registration result that registration of the third identification information was performed correctly executes said software under an ordinary operating environment, wherein said server, when it is determined that such combination is not found and that the third identification information is already registered in respect of another information processing terminal, sends back to said information processing terminal a registration result that registration of the third identification information was not performed correctly, wherein the information processing terminal, when having received a registration result that said registration was not performed correctly is allowed to execute said software content under a restricted operating environment.

22. A server which is connectable through a network with a plurality of information processing terminals, each information processing terminal executing software read from on an information recording medium, said server comprising:

a data-base which stores registration information in which a first identification information individual to each information processing terminal is recorded in association with a second identification information allocated to a software title and a third identification information individually allocated to each information recording medium in respect of the software title, wherein in response to a request for a registration confirmation with information including said first and second identification information from said information processing terminal which is connected to the server via a communication network, the server looks up said registration information in said data-base and tranmits a result of the registration information looking-up to said information processing terminal, wherein said information processing terminal receives a first checking result which allows said information processing terminal to execute said software under an ordinary operating environment if the combination of said first and second identification information that is sent from said information processing terminal is found in said registration information, wherein, if said combination of the first and second identification information does not exist on said data-base, said server sends to said information processing terminal a second checking result seeking the registration of the third identification information in respect of said information processing terminal, wherein, in response to a further registration request received together with said third identification information, said server looks up the status of the third identification information, wherein, if said third identification information that was sent from the information processing terminal is not registered association with any other information processing terminal, said server registers the third identification information in association with said information processing terminal and sends to said information processing terminal a first registration result which allows the information processing terminal to execute the software under an ordinary operating environment, wherein, if said third identification information is registered in association with another information processing terminal, or if at least any one of said first identification information, second identification information or third identification information contains abnormality, said server sends to said information processing terminal a second registration result which allows the information processing terminal to execute said software under a restricted operating environment.

23. A server which is connectable through a network with a plurality of information processing terminals, each information processing terminal being executable of software read from an information recording medium, said server comprising:

a data-base which stores registration information in which a first identification information individual to each information processing terminal is recorded in association with a second identification information allocated to a software title and a third identification information individually allocated to each information recording medium in respect of the software title, wherein, in response to a request for a registration condition confirmation with information including said first, second and third identification information from said information processing terminal which is connected to the server via a communication network, the server looks up said registration information in said data-base and transmits a result of the looking-up said information processing terminal, wherein, said information processing terminal receives a checking result which allows said processing terminal to execute said software under an ordinary operating environment if the combination of said first, second and third identification information that is sent from said information processing terminal is found in said registration information, wherein, if said combination of said first, second and third identification information does not exist in said data-base, and if said third identification information is not registered in association said with any other information processing terminal, said server registers the third identification information in association with said information processing terminal and sends to said information processing terminal a first registration which allows the information processing terminal to execute the software under an ordinary operating environment, wherein, if said third identification information is registered in association with another information processing terminal, or at least any one of said first identification information, second identification information or third identification information contains abnormality, said server sends to said information processing terminal a second registration result which allows the information processing terminal to execute said software under a restricted operating environment.

24. A recording medium connectable or mountable to an information processing terminal according to claim 20, said recording medium comprising the software content and a license verification program which causes said information processing terminal to execute the software content in accordance with the checking result or the registration result sent from said server.

25. A recording medium connectable or mountable to an information processing terminal according to claim 21, said recording medium comprising the software content and a license verification program which causes said information processing terminal to execute the software content in accordance with the checking result or the registration result sent from said server.

26. A license management system for a software content distributed by means of information storage media to users, the software content being executable on an information processing device at each of licensed users, said system comprising:

a server at a licenser for the software content;

network connection means with which a plurality of information processing devices are connectable to said server via a communication network; and a data-base coupled to said server, wherein each of said plurality of information processing devices is allocated with an identification individual to the respective information processing device, and each of said information storage media is allocated with an idenitification individual to the respective information storage medium, wherein said data-base stores a registration information in which the individual identification for each of the information storage media is registered in association with the individual identification of the information processing device on which the software content read from the information storage medium is licensed to use, wherein the registration on said data-base is made by a procedure at the server of:

receiving a request for registration transmitted from an information processing device connected to the server via a communication network, verifying on said data-base the received request for registration which includes information of the identification individual to the information processing device, information of the identification individual to the information storage medium form which said software content is read into said information processing device, and information indicative of said software content, and registering the received information on said data-base and sending to said information processing device via a communication network a license confirmation allowing the information processing device to execute the software content under a licensed condition when the combination of said identifications in respect of the software content is new on said data-base, or rejecting the registration when the identification of the information storage medium is already registered on the data-base in association with an identification of another information processing device in respect of the software content.

27. An information processing device operable in accordance with the license management system of claim 26, comprising:

interface means with which an information storage medium stored with the software content is mountable;

network connection means connectable to said server at the licenser of the software content;

first storage means stored with an identification individual to the information processing device;

second storage means on which information of a license confirmation sent from the server is to be stored, wherein the information of said license confirmation includes information indicative of the identifications of the information processing device and of the information storage medium mounted on said information processing device and information indicative of the software content, wherein, when an information storage medium is mounted on the information processing device, a verification program starts to verify whether the identification of the information storage medium is registered in association with the identification of the information processing device in respect of the software content in the information of a license confirmation in said second storage means, wherein the information processing device is allowed to execute the software content read from the information storage medium under licensed condition when the identification of the information storage medium is found in the information of the license confirmation.

28. An information processing device according to claim 27, wherein the information processing device is rejected to execute the software content read from the information storage medium under the licensed condition when an information of the license confirmation is not found in the second storage means or when the identification of the information storage medium is not found in the information of the license confirmation in the second storage means.

29. An information processing device according to claim 28, wherein said information processing device is a game device and said software content is a game program executable on said game device.

30. An information storage medium stored with a software content operable in accordance with the license management system of claim 26, comprising:

an identification individual to the information storage medium; and a software content stored on the information storage medium;

wherein, when mounted on an information processing device, a verification program starts to verify whether the identification of the information storage medium is registered in association with the identification of the information processing device in respect of the software content in the information of a license confirmation estored in the information processing device, wherein the software content read from the information storage medium is allowed to be executed on the information processing device under the licensed condition when the identification of the information storage medium is found in the information of said license confirmation.

31. An information storage medium according to claim 30, wherein when information of a license confirmation including the identification of the information storage medium is not found on the information processing device, the information processing device is required to register the identification of the information storage medium to the license management system.

32. An information storage medium according to claim 30, wherein the software content stored on the information storage medium is rejected to be executed on the information processing device under the licensed condition when the identification of the information storage medium is not found in the information of said license confirmation.

33. An information storage medium according to claim 30, wherein said information processing device is a game device and said software content is a game program executable on said game device.

34. A license management system for a software content distributed by means of information storage media each stored with the software content, the software content being executable on an information processing device at each of licensed users, said system comprising:

a server at a licenser for the software content;

a data-base coupled to said server; and network connection means with which a plurality of information processing devices are connectable to said server via a communication network;

wherein said data-base stores registration information in which information individual to each of said information storage media is registered in association with information individual to the information processing device in respect of the software content, wherein the registration on said data-base is made by a procedure of:

receiving, from an information processing device via a communication network, a request for registration with information individual to the information storage medium, information individual to the information processing device on which the information storage medium is mounted, and information indicative of the software content which is requested for a license to use on said information processing device, verifying the received request for registration by comparing the received information with registration information on said data-base, and conducting registration concerning the received information on said data-base and issuing to said information processing device via a communication network a license confirmation allowing the information processing device to execute the software content read from said information storage medium under a licensed condition when the combination of the information individual to said information storage medium and to said information processing device in respect of the software content is new on said data-base, wherein, without registration or when the registration is rejected, the information processing device is allowed to execute the software content under a restriction in which a function of the software content is at least partially restricted.

35. A license management system according to claim 34, wherein said restirction includes the time period of use of the software content.

36. A license management system for software distributed for use on information processing devices, said system comprising:

a server located at a site of the licenser to the software; and network connection means via which information processing devices at users of the software are connectable to said server;

wherein said server comprises a data-base which is stored with information indicative if identifications of users, who have requested for license registration from the information processing devices connected to said server via said network connection means, in association with the information indicative of the software;

wherein the registration on said data-base is made by a procedure of:

receiving a request for registration, which is sent via said network connection means from an information processing device on which the software is to be executed, said request containing information indicative of an identification individual to the user given by the licenser and information indicative of the software, verifying the received request for registration by comparing the received information with information registered on said data-base, and conducting registration concerning the received information on said data-base and issuing to said information processing device via said network connection means a license confirmation allowing the information processing device to execute the software under a licensed condition when the information indicative of the identification individual to the user is new on said data-base in respect of information indicative of the software, wherein, without the registration or when the registration is rejected, the information processing device is allowed to execute the software under a restriction in which a function of the software is at least partially restricted.

37. A license management system according to claim 36, wherein said restriction includes a time period of use of the software.

38. An information storage medium for supplying an information processing device with a software, a license status of which is controlled by the license management system according to claim 37.

* * * * *

UNITED STATES PATENT AND TRADEMARK OFFICE
CERTIFICATE OF CORRECTION

PATENT NO. : 6,510,502 B1
DATED : January 21, 2003
INVENTOR(S) : Yusuke Shimizu

It is certified that error appears in the above-identified patent and that said Letters Patent is hereby corrected as shown below:

Title page,
Item [22], delete "Filed: Jul. 17, 2000" and insert -- PCT Filed: May 14, 1999 --.
After Item [22], insert
-- [86] PCT No.: PCT/JP99/02525

§ 371 (C)(1),
(2), (4) Date: Jul. 17, 2000

[87] PCT Pub. No.: WO99/59058
PCT Pub. Date: Nov. 18, 1999 --.

Column 18,
Line 63, "sofware" should read -- software --.

Column 19,
Line 8, "sofware" should read -- software --.
Line 47, before "second", delete "the".

Column 20,
Line 20, after "connectable", delete "or mountable".
Line 33, "terminal, transmits" should read -- terminal transmits --.
Line 51, after "identification", insert -- information --.

Column 21,
Line 29, "medium;" should read -- medium, --.
Line 54, "send" should read -- sends --.
Line 55, after "third", insert -- identification --.
Line 57, "abnormally" should read -- abnormality --.

Column 22,
Line 2, "medium" should read -- medium, --.
Lines 14-15, after "allocated to", delete "the software content and the third identification information allocated to".

Column 23,
Line 26, after "software", insert -- content --.
Line 41, after "from", delete "on".
Line 51, "wherein in" should read -- wherein, in --.
Line 57, "tranmits" should read -- transmits --.

UNITED STATES PATENT AND TRADEMARK OFFICE
CERTIFICATE OF CORRECTION

PATENT NO. : 6,510,502 B1
DATED : January 21, 2003
INVENTOR(S) : Yusuke Shimizu

It is certified that error appears in the above-identified patent and that said Letters Patent is hereby corrected as shown below:

<u>Column 24,</u>
Line 11, after "registered", insert -- in --.
Line 46, after "looking-up", insert -- to --.
Line 58, after "association", delete "said".

<u>Column 25,</u>
Line 1, "or at" should read -- or if at --.
Line 37, "idenitification " should read -- identification --.
Line 54, "form" should read -- from --.

<u>Column 26,</u>
Line 59, estored" should read -- stored --.

<u>Column 28,</u>
Line 5, "restirction" should read -- restriction --.
Line 17, "if" should read -- of --.

Signed and Sealed this

Seventh Day of October, 2003

JAMES E. ROGAN
*Director of the United States Patent and Trademark Office*